(12) United States Patent
Rivkin et al.

(10) Patent No.: US 9,153,254 B1
(45) Date of Patent: Oct. 6, 2015

(54) UNBALANCED DATA WRITER COIL

(71) Applicant: Seagate Technology LLC, Cupertino, CA (US)

(72) Inventors: Kirill Rivkin, Eden Prairie, MN (US); Mourad Benakli, Eden Prairie, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/333,310

(22) Filed: Jul. 16, 2014

(51) Int. Cl.
*G11B 5/127* (2006.01)
*G11B 5/17* (2006.01)

(52) U.S. Cl.
CPC ............ *G11B 5/17* (2013.01); *G11B 5/1278* (2013.01)

(58) Field of Classification Search
CPC ...... G11B 5/127; G11B 5/1278; G11B 5/147; G11B 5/17; G11B 5/21; G11B 5/31; G11B 5/313
USPC ............ 360/123.06, 123.07, 123.08, 123.19, 360/123.2, 123.21, 123.4, 123.41, 123.42, 360/123.02, 123.03, 123.05, 123.38, 360/125.03, 125.12, 125.15
See application file for complete search history.

(56) References Cited

U.S. PATENT DOCUMENTS

| | | | |
|---|---|---|---|
| 6,721,130 B2 * | 4/2004 | Yazawa et al. | 360/123.39 |
| 7,206,168 B2 | 4/2007 | Sato et al. | |
| 7,319,572 B2 | 1/2008 | Htsuka et al. | |
| 7,372,664 B1 | 5/2008 | Mallary et al. | |
| 7,511,921 B2 | 3/2009 | Mallary et al. | |
| 7,791,837 B2 * | 9/2010 | Fujiwara | 360/123.41 |
| 8,064,160 B2 | 11/2011 | Ohta et al. | |
| 8,339,736 B2 * | 12/2012 | Gao et al. | 360/123.06 |
| 8,514,517 B1 | 8/2013 | Batra et al. | |
| 8,547,659 B1 | 10/2013 | Bai et al. | |
| 8,619,389 B1 | 12/2013 | Saito et al. | |
| 2013/0176644 A1 * | 7/2013 | Sasaki et al. | 360/245.3 |
| 2013/0242432 A1 * | 9/2013 | Meloche et al. | 360/123.05 |
| 2013/0321955 A1 | 12/2013 | Benakli et al. | |

* cited by examiner

*Primary Examiner* — Jefferson Evans
(74) *Attorney, Agent, or Firm* — Hall Estill Attorneys at Law

(57) ABSTRACT

A data writer may be configured with at least a write pole and a continuous coil with the continuous coil having a first turn with a first cross-sectional shape and a second turn with a second cross-sectional shape that differs from the first cross-sectional shape. The second turn may be positioned proximal a leading edge of the write pole and an air bearing surface while the first turn is positioned distal the air bearing surface.

20 Claims, 4 Drawing Sheets

UNBALANCED DATA WRITER COIL

SUMMARY

Various embodiments may configure a data writer with at least a write pole and a continuous coil with the continuous coil having a first turn with a first cross-sectional shape and a second turn with a second cross-sectional shape that differs from the first cross-sectional shape. The second turn may be positioned proximal a leading edge of the write pole and an air bearing surface while the first turn is positioned distal the air bearing surface.

DETAILED DESCRIPTION

Increasing data capacity and data access speeds has been a continued emphasis of consumers and industry. Greater data bit areal density may provide heightened data storage capacities, but can lead to errors and degraded performance in the event data accessing components, such as a data writer or reader, cannot reliably access individual data bits. For example, shrinking a data writer to sub-angstrom scale dimensions can be plagued with timing jitter and large write field risetime due at least in part to increased data bit access timing and reduced physical dimensions of data writer components, such as a write pole, yoke, coil, and shield. Hence, there is an evolving goal of increasing data access performance in reduced form factor data storage devices employing high data bit areal density.

With these issues in mind, a data writer can be configured with a write pole and a continuous coil with the continuous coil having a first turn with a first cross-sectional shape and a second turn with a second cross-sectional shape that differs from the first cross-sectional shape and the second turn positioned proximal a leading edge of the write pole and an air bearing surface while the first turn is positioned distal the air bearing surface. Tuning the size, shape, and position of the various turns of the continuous coil can increase data writing performance by decreasing timing jitter and write field risetime. Moreover, the ability to tune the assorted data writing components allows for continued increase in data bit areal density and data access timing in the future.

Figure 1:
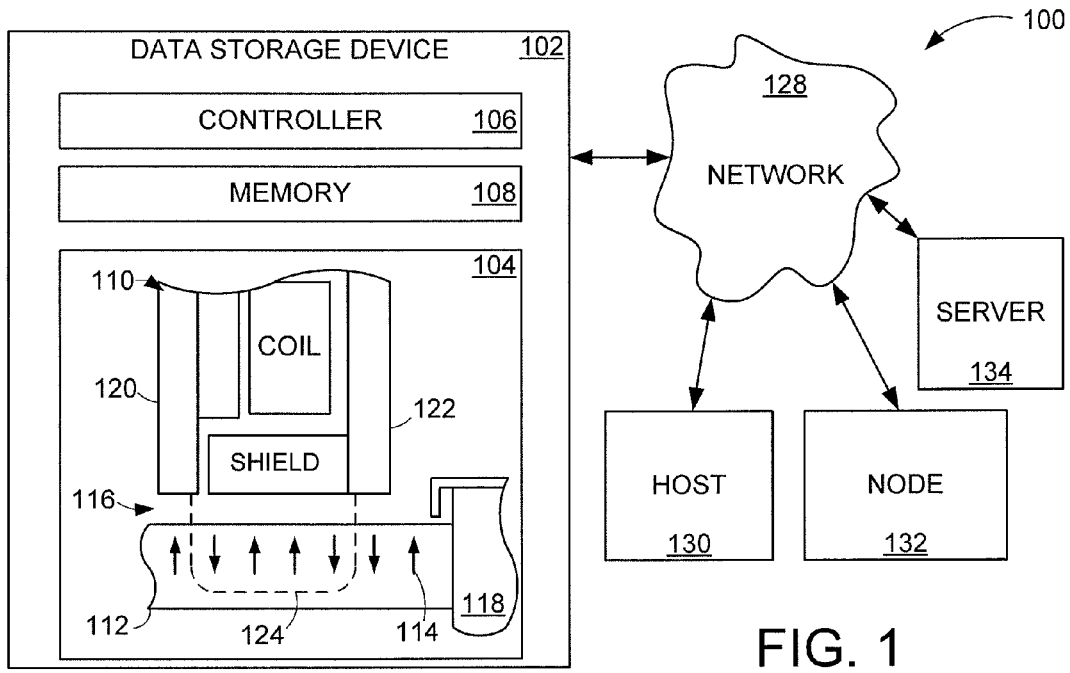
FIG. 1 is a block representation of an example portion of a data storage system configured and operated in accordance with some embodiments.

It should be noted that while the various aspects of the current disclosure are directed towards a data writer, such examples are not required or limiting as other data access components, like a data reader, may employ some or all of the embodiments discussed herein. FIG. 1 generally illustrates a block representation of an example data storage system 100 configured in accordance with various embodiments. The data storage system 100 may consist of one or more data storage devices 102 each configured with at least one transducing assembly 104 that is controlled by one or more local controllers 106 that temporarily and permanently stores data to and retrieves data from the transducing assembly 104 and a local memory 108, which can be an unlimited variety of memories, such as a volatile, non-volatile, and solid-state memory.

As shown, the transducing portion 104 has a transducing head 110 suspended over a magnetic storage medium 112 that is capable of storing programmed bits 114 in a predetermined orientation, such as perpendicular or longitudinal to an air bearing surface (ABS) 116. The storage medium 112 is attached to and controlled by a spindle motor 118 that rotates to produce the ABS 116 on which the transducing head 110 flies to access selected data bits 114 from the medium 112. The transducing head 110 can include one or more transducing elements, such as a magnetic writer and magnetically responsive reader, which operate to program and read data from the storage medium 112, respectively. The writing element portion of the transducing head shown in FIG. 1 can generate magnetic flux from a coil and emit predetermined amounts of the magnetic flux from a write pole 120 to a return pole 122 through the storage medium 112 in a circuit 124 to impart a predetermined polarity that programs at least one data bit 114.

The data storage device 102 may be operated locally and remotely via connection to any number of wired and wireless connections via at least one network 128. While not limited to any particular type or number of remote connections, one or more hosts 130, nodes 132, and servers 134 can concurrently and autonomously access the data storage device 102. For example, the network 128 may enable the data storage device 102 to be part of a cloud computing system or a redundant array of independent discs (RAID) via appropriate protocol. The unlimited variety of local and remote computing configurations allows the data storage system 100 to be adapted and optimized for a diverse array of applications.

Figure 2:
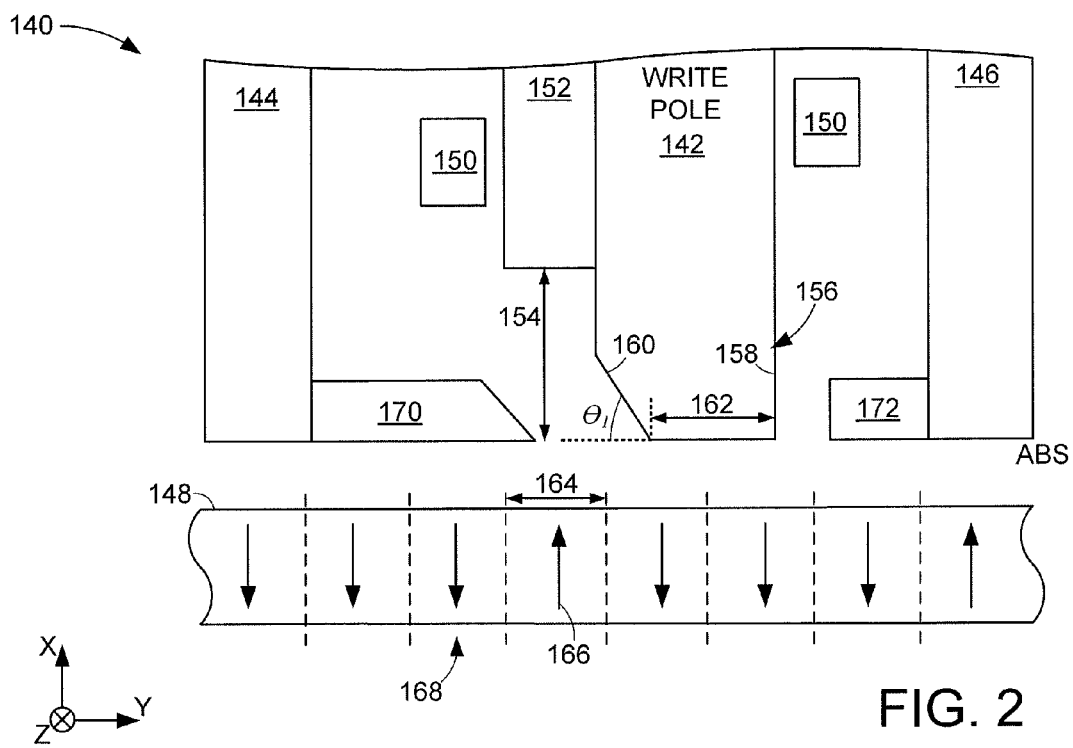
FIG. 2 shows a cross-sectional view block representation of a portion of an example data writer capable of being utilized in the data storage system of FIG. 1.

FIG. 2 displays a block representation of a portion of an example data writer 140 constructed and operated in accordance with some embodiments. The data writer 140 has a main write pole 142 that is disposed between leading 144 and trailing 146 return poles, as dictated by the direction of travel of the adjacent data storage medium 148. Magnetic flux may be directed, at least partially, from a write coil 150 to the write pole by a yoke 152 that is recessed from the ABS by a predetermined distance 154. The main write pole 142 has write pole tip 156 shaped with a rectangular sidewall 158 aligned along the X axis and a tapered sidewall 160 positioned at a common angle $\theta_1$ from the X axis. The common angle $\theta_1$ can be tuned to funnel magnetic flux to a trailing portion 162 of the write pole tip 156 on the ABS. The trailing portion 162 may be configured, in some embodiments, to match the width 164 of a data bit 166 between data tracks 168.

As the areal density of the data bits 162 increases to provide greater data capacity, the data bit width 164 associated with a data track 168 decreases. Such reduced data track spacing emphasizes the accuracy magnetic flux delivery from the write pole 142 as well as shielding from leading 170 and trailing 172 shields on the ABS. That is, the leading 170 and trailing 172 shields can be tuned for material, size, and position on the ABS to absorb external magnetic fields and define a magnetic extent of the write pole 142 on the data storage medium 148 that allows individual data bits 162 to be programmed. However, nanometer scale physical dimensions for the various data writer 140 components can restrict magnetic flux delivery to the data storage medium 148. For instance, bringing one or both shields 170 and 172 in closer proximity to the write pole tip 156 can reduce the magnetic extent of the write pole 142, but can be prone to unwanted magnetic shunting that decreases writer performance.

The minimization of physical dimensions of the various data writer 140 components can further result in slow magnetic writing dynamics as magnetic flux saturates and travels from the coil 150 to the yoke 152 and write pole 142 before reaching the data storage medium 148. Therefore, despite the tapered configuration of the write pole tip 156, position of the shields 170 and 172 on the ABS, and recess of the yoke 152 from the ABS, the smaller physical dimensions of the data writer 140 can lead to degraded data writing dynamics as magnetic flux is slow to pass from the write coil 150 to the data storage medium 148 relative to the data access timing associated with increased areal density data storage environments.

Figure 3:
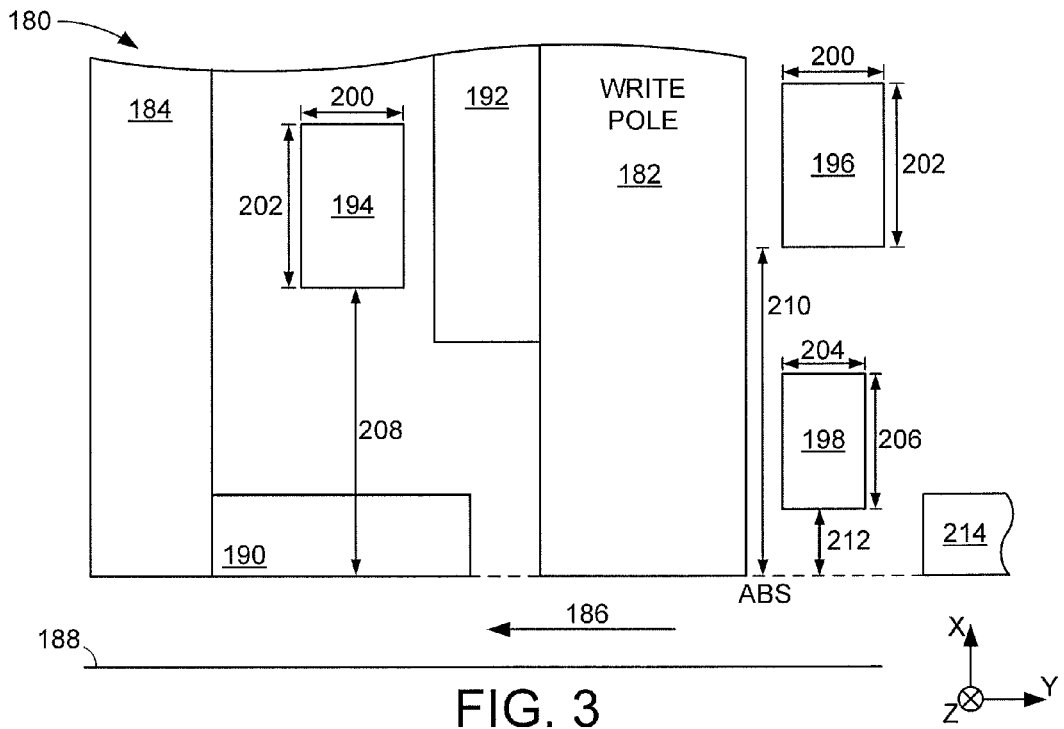
FIG. 3 displays a cross-sectional view block representation of a portion of an example data writer configured in accordance with various embodiments.

FIG. 3 displays a block representation of a portion of an example data writer 180 that can be used in the data storage system 100 of FIG. 1 in accordance with some embodiments. The data writer 180 is configured with a main write pole 182 positioned downtrack from a return pole 184, as dictated by the movement 186 of the adjacent data storage medium 188. It should be noted that although a single return pole 184 is shown in FIG. 3, additional return poles might be incorporated into the data writer 180, without limitation. The space between the return 184 and main 182 poles can be filled with non-magnetic insulating material as well as a leading shield 190 on the ABS, a leading yoke 192 attached to the main pole 182, and a first coil turn 194 of a data writing coil that continuously extends to second 196 and third 198 coil turns on an opposite, trailing side, of the main write pole 182.

As shown, the first 194 and second 196 coil turns are configured with common cross-sectional widths 200 and heights 202 that each differ from the cross-sectional length 204 and height 206 of the third 198 coil turn. In accordance with assorted embodiments, the first 194, second 196, and third 198 coil turns are respectively positioned at different distances 208, 210, and 212 from the ABS along the X axis. The shape, size, and position of the first 194, second 196, and third 198 coil turns can be tuned to an unlimited variety of configurations that can aid data writing dynamics by increasing write pole 182 saturation and write field gradient. The non-limiting example of FIG. 3 illustrates how the third coil turn 198 can have smaller cross-sectional dimensions and be positioned closer to the write pole 182 than first 194 and second 196 turns to more efficiently generate magnetic flux in the write pole 182, switch between writing field polarities, and deliver magnetic flux to the adjacent data storage media 188.

However, the position of the third coil turn 198 proximal the ABS and trailing shield 214 can degrade write field gradient as the trailing shield 214 is set to a magnetization direction that matches the write pole 182. Likewise, the first coil turn 194 can inadvertently saturate the leading shield 190 and degrade write field gradient. Thus, regardless of the tuned cross-sectional shape and position of the coil turns 194, 196, and 198, the position of the third coil turn 198 on the trailing edge of the write pole 182 can inhibit data writer 180 performance by saturating the ABS shields 190 and 214, increasing the risk of erasure conditions, and decreasing static and dynamic writing efficiency.

Figure 4:
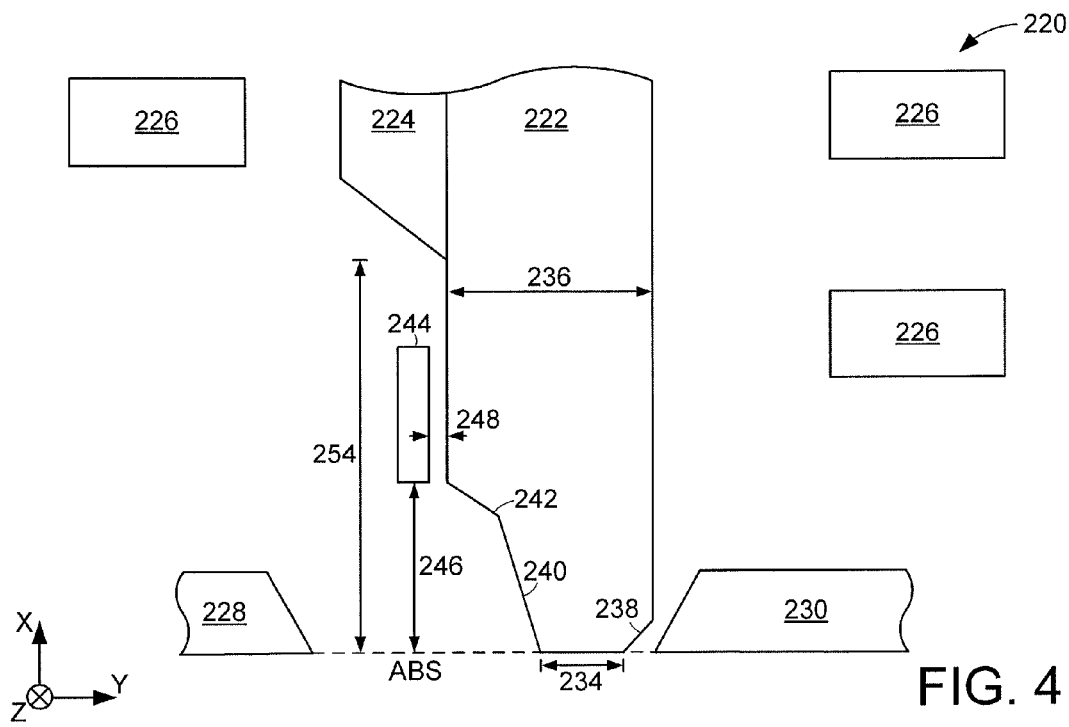
FIG. 4 illustrates a cross-sectional view block representation of a portion of an example data writing element arranged in accordance with some embodiments.

FIG. 4 illustrates a block representation of a portion of an example data bit writing element 220 that is constructed and operated in accordance with various embodiments. The writing element 220 may be part of a transducing head that contains a data bit sensing element, such as a magnetoresistive data reader, but such configuration is not required or limiting. The writing element 220 is configured with a write pole 222 and yoke 224 disposed between various coil turns of a continuous write coil 226. The write pole 222 is further disposed between leading 228 and trailing 230 shields on the ABS.

The write pole 222 has a tuned write pole tip 232 on the ABS that provides a reduced ABS cross-sectional width 234 compared to the width 236 of the write pole 222 distal the ABS. The reduced write pole width 234 can serve to efficiently funnel magnetic flux towards the ABS and form a magnetic flux path with a precise area of an adjacent data storage medium, such as a less than 10 nanometer data bit area. While the write pole tip 232 can be shaped in any manner, the non-limiting embodiment of FIG. 4 shows how multiple different tip surfaces can be tuned to be similar and dissimilar lengths and angles with respect to the ABS and Y axis to optimize data bit programming performance. That is, the write pole tip 232 can have one or more differently angled tip surfaces 238, 240, and 242 that reduce the write pole width 236 to an ABS width 234 with a cross-sectional shape that promotes write field angle and data bit resolution of the data writing element 220.

However, a tuned write pole tip 232 cannot, alone, alleviate timing jitter and slow write field risetime that can arise due to the high areal bit density of an adjacent data storage medium and nanometer scale physical dimensions of the write pole 222 and yoke 224. It is contemplated that at least one coil turn of the continuous coil 226 can be proximal the ABS and have a cross-sectional shape and size that differs from other coil turns, such as the embodiment shown in FIG. 3. Such differently configured coil turns can degrade static and dynamic data writer efficiency as shields positioned on the ABS are more prone to saturate in a direction common with the write pole 222.

Accordingly, the writing element 220 can have a tuned coil turn 244 positioned predetermined distances from the ABS 246 and write pole tip 248 that optimize timing jitter and magnetic field risetime. The unbalanced combination of the ABS coil turn 244 having a smaller physical cross-sectional size and different shape compared to the other continuous coil 226 turns and the position of the ABS coil turn 244 close to the tapered surfaces 242 and 240 of the leading edge of the write pole tip 232 reduces leading shield 228 saturation and side shield erasure. Although not required or limiting, various embodiments configure the write pole tip distance 248 as 100-200 nm, the ABS distance 246 as 250-500 nm, and the ABS coil turn 244 with a rectangular shape having a greater length along the X axis than along the Y axis.

It is believed that the placement of the ABS coil turn 244 on the leading edge of the write pole 222 and aligned with the top of the tapered write pole tip surface 242 allows magnetic charge to move from the leading edge of the write pole 222 to the trailing edge after a flux path from the write pole tip 232 to an adjacent data storage medium is already established, which can reduce saturation of the leading shield 228 and risk of inadvertent adjacent track interference and side track erasure conditions. The elongated cross-sectional shape of the ABS coil turn 244 along the X axis of the X-Y plane and tuned position on the leading edge of the write pole 222 relative to the write pole tip 232 and ABS allows efficient saturation of the write pole 222 without unduly imparting magnetic fields on the writing element 220 shields.

The writing element 220 may further be tuned to control the interaction of the yoke 224 and ABS coil turn 244. As shown, the ABS coil turn 244 can be positioned in a yoke recess 250 that is bounded by the width of the yoke, ABS, and an ABS surface 252 of the yoke 224. Tuning the distance 254 between the ABS and ABS surface 252, along with tuned shape and size of the ABS surface 252, such as rectangular, tapered, and curvilinear surface shapes, can control how the ABS coil turn 244 saturates the yoke 224 and consequently the write pole 222. For instance, bringing the ABS surface 252 closer to the ABS and ABS coil turn 244 can increase the magnetic saturation strength, but may also delay full write pole 222 saturation. Conversely, increasing the separation of the ABS coil turn 244 and the yoke 224 can allow weaker, but faster, write pole risetime.

Figure 5:
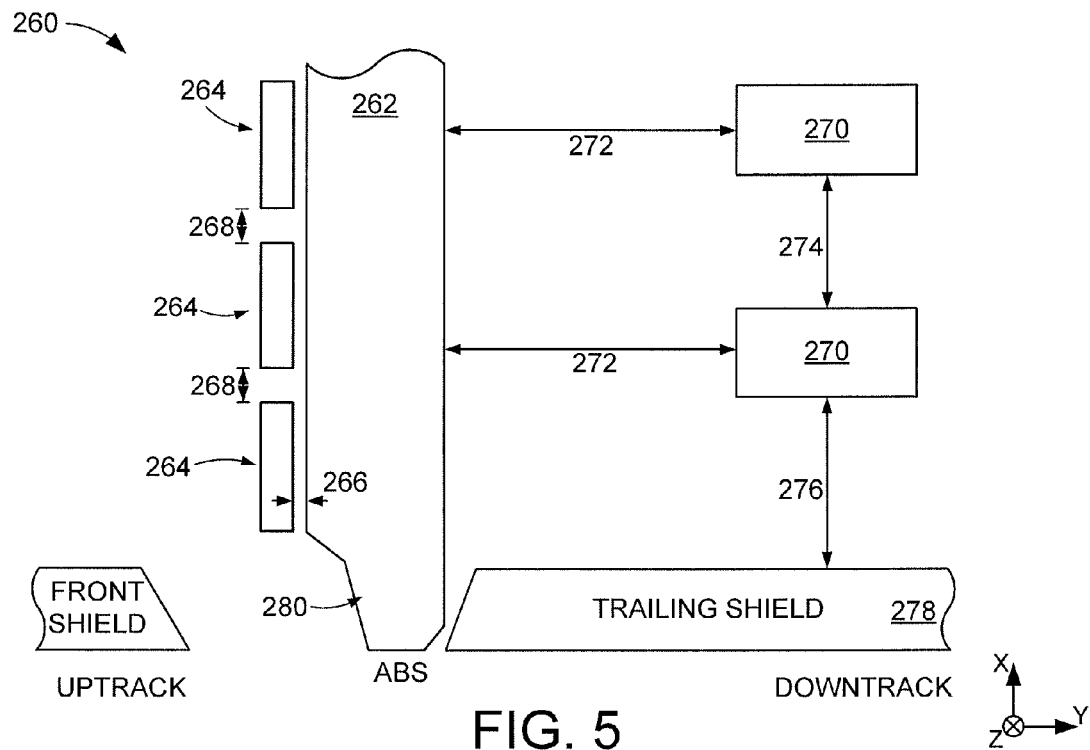
FIG. 5 is a cross-sectional view block representation of a portion of an example data writer configured in accordance with various embodiments.

FIG. 5 illustrates a block representation of a portion of an example data writer 260 configured without a yoke mounted to the write pole 262 proximal the ABS. The yokeless embodiment shown in FIG. 5 has a plurality of tuned coil turns 264 each positioned a predetermined distance 266 from the leading edge of the write pole 262. It is contemplated that the plurality of tuned coil turns 264 have different shapes and sizes that can control the write pole risetime and risk of erasure. In the non-limiting embodiment of FIG. 5, each tuned coil turn 264 has a common cross-sectional shape that is elongated along the X axis and is separated from adjacent coil turns by a common distance 268.

The close proximity of the tuned coil turns 264 to the leading edge of the write pole 262 can be complemented by increased separation of the trailing coil turns 270 from the trailing edge of the write pole 262. The increased separation distance 272 and intercoil separation distance 274 can be tuned with respect to the distance 276 from the coil turns 270 to the trailing shield 278 to minimize trailing shield 278 saturation from the coil turns 270. While the trailing coil turns 270 may be individually tuned to different cross-sectional shapes and sizes, elongating each coil turn 270 along the Y axis may further minimize the risk of write fields saturating the trailing shield 278.

With the ability to position multiple coil turns 264 on the leading edge of the write pole 262, the trailing edge coil turns 270 can be further separated from the write pole 262, such as by a greater separation distance 272 than coil-to-shield distance 276. Such increased separation allow the trailing shield 278 to be positioned closer to the tapered write pole tip 280 on the ABS to provide more precise shielding of the write pole 262 compared with the write coil 270 being closer to the shield 278 and ABS. That is, a heightened risk of trailing shield saturation from the continuous write coil can lead to increased separation of the trailing shield 278 from the write pole tip 280 to ensure trailing shield saturation does not degrade write pole data writing operations. Hence, configuring the leading edge coil turns 264 to be close to the write pole 262 corresponds with the trailing edge coil turns 270 to be increasingly separated from the trailing shield 278 and write pole 262, which allows the trailing shield 278 to provide optimized data writer 260 shielding by being closer to the write pole tip 280.

The ability to position multiple coil turns 264 aligned along the X axis proximal the leading edge of the write pole allows for tuned delivery of magnetic flux from the coil turns 264 to the write pole tip 280. The position of multiple leading edge coil turns 264 adjacent the leading edge of the write pole 262 and aligned with the top edge of the write pole tip 280 sloped surfaces along the Y axis can provide different magnetic flux delivery characteristics, such as write field risetime, than if a yoke structure was present between one or more leading edge coil turns 264. Hence, the lack of a leading edge yoke structure can increase magnetic field delivery to the write pole tip 280, but can also increase risk of data bit erasure as large amounts of magnetic flux can be present close to the front shield and ABS.

Figure 6:
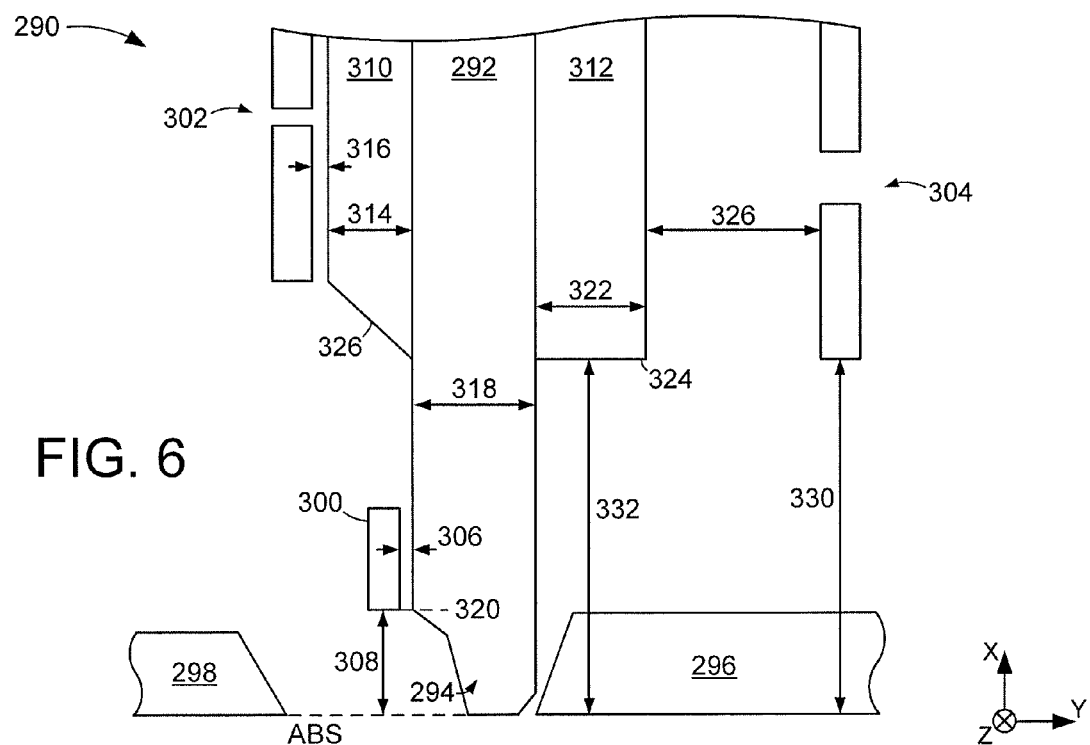
FIG. 6 shows a cross-sectional view block representation of a portion of an example data writer constructed and operated in accordance with some embodiments.

FIG. 6 illustrates a block representation of a portion of an example data writer 290 constructed and operated in accordance with some embodiments to provide tuned data bit programming. The data writer 290 has a main write pole 292 tuned with a tapered write pole tip 294 on the ABS. The write pole tip 294 can be shaped and sized in reference to one or more ABS shields, such as the trailing 296 and leading 298 shields, to provide a nanometer scale magnetic extent. A single ABS coil turn 300 is positioned closer to the main write pole 292 and ABS than leading 302 and trailing 304 coil turns, as shown by Y axis distance 306 and ABS distance 308 along the X axis.

The tuned configuration of the ABS coil turn 300 having a smaller shape and size than the leading 302 and trailing 304 coil turns allows for an optimized balance of increased write field risetime with minimal risk of erasure conditions. The risk of erasure is reduced by positioning leading 310 and trailing 312 yokes on opposite sides of the main write pole 292. The placement of the ABS coil turn 300 in the recess between the ABS and leading yoke 310, along the X axis, serves to provide enough magnetic flux to optimize data writing dynamics without increasing the volatility of data bit programming.

The leading 310 and trailing 312 yokes can be tuned, independently, individually, and collectively, to control the manner of magnetic flux delivery to the write pole tip 294. In the non-limiting embodiment of FIG. 6, the leading yoke 310 has a width 314 that is greater than the separation distance 316 between the leading coil turns 302 and the yoke 310 to allow for efficient saturation of the leading yoke 310 without increasing the risk of leading shield 296 saturation and inadvertent data bit erasure. The width 314 of the leading yoke 310 may also be tuned in relation to the width 318 of the main write pole 292. For example, the yoke 310 width 314 can be less than the main write pole width 318, as measured along the Y axis, to increase the probability that a flux path to an adjacent data storage medium will originate from the trailing edge of the write pole tip 294 instead of the leading edge 320.

Some embodiments configure the shape and size of the leading yoke 310 matches the trailing yoke 312 while other embodiments have the yokes 310 and 312 tuned to dissimilar configurations. As shown in FIG. 6, the trailing yoke 312 can be tuned to have a greater width 322 along the Y axis than widths 318 or 314. Such larger yoke width 322 can have a rectangular shape defined by an ABS surface 324 that runs parallel to the ABS. The rectangular shape of the trailing yoke 312 can reduce ABS shield saturation, but may delay magnetic field risetime in the main write pole 292. Conversely, an ABS surface that is tapered to the ABS and Y axis, such as surface 326, can saturate the main write pole 292 more efficiently, but can bring magnetization closer to the ABS and ABS leading shield 298.

Regardless of the shape and size of the data writer yokes 310 and 314, the position, shape, and size of the leading 302 and trailing 304 coil turns can optimize the switching of magnetic field polarities in the main write pole 292. As illustrated, the larger trailing yoke 312 can correspond with greater leading separation distance 326 between the trailing coil turns 304 and the trailing yoke 312. The alignment of the trailing coil turns 304 with ABS surface 324 can complement the large separation distance 326 compared to the leading separation distance 316 to ensure the write coils 302 and 304 provide magnetic flux first to the leading edge of the main write pole 292, which can help decrease magnetic field rise-time without unduly raising the risk of ABS shield saturation and erasure conditions.

The common separation distances 330 and 332 between the ABS and the trailing yoke 312 and the ABS and the trailing coil turns 304 means that no coil turn is in the recess between the trailing yoke 312 and ABS to saturate the trailing shield 296 and increase the risk of data bit erasure conditions. It is contemplated that the trailing coil turns 304 can be oriented at different angles with respect to the ABS as well as be configured with different sizes and shapes compared to the leading coil turns 302 to tune the manner in which the main write pole 292 saturates, switches, and programs data bits.

It should be noted that while the various coil turns are characterized in relation to their respective position relative to the main write coil 292, such characterization does not limit the coil turns to separate entities. For example, a single continuous write coil can be configured with the different, tuned aspects displayed respectively by the ABS 300, leading 302, and trailing 304 coil turns. The ability to tune the various shapes, sizes, and positions of the coil turns, yokes, and shields allows the data writer 290 to be adjusted to provide varying programming write field angle, speed, and switching efficiency.

Figure 7:
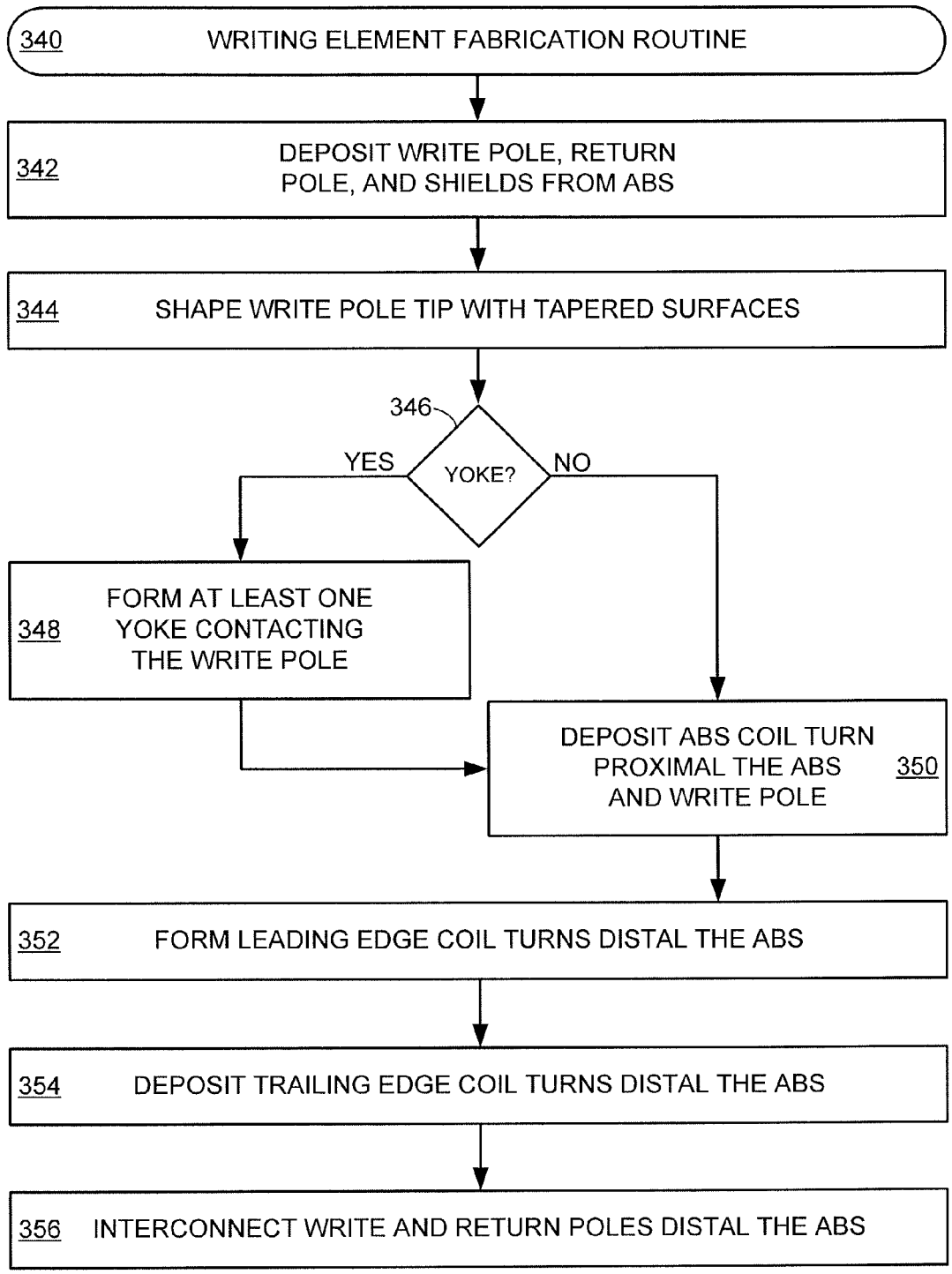
FIG. 7 provides a flowchart for an example writing element fabrication routine that may be carried out in accordance with various embodiments.

FIG. 7 provides an example writing element fabrication routine 340 that can be carried out in accordance with various embodiments. The routine 340 can begin in step 342 by depositing a write pole, at least one return pole, and one or more shields on a substrate that defines an ABS surface. It is contemplated that the deposition of the various components in routine 340 can be conducted with common or dissimilar formation techniques that may involve changes of material, tools, and timing. For example, the write pole may be deposited via sputtering of a first material that differs from the material and deposition technique used to form one or more side, leading, and trialing shields positioned on the ABS.

The formation of the main write pole in step 342 can be done before or during the shaping of a write pole tip in step 344. That is, step 344 may remove material from an existing main write pole after the pole has been formed or the multiple sloped write tip surfaces can be formed through patterned deposition of the main write pole in step 342, without removing any material. The routine 340 may construct the writing element with a single write pole disposed between leading and trailing return poles, in some embodiments, and may position one or more ABS shields, such as leading trailing, and multiple side shields about the main write pole on the ABS.

Although steps 342 and 344 construct various writing element components from the ABS, such fabrication is not limiting or required as the write pole, return pole, and any shields can be grown, deposited, and formed from any substrate surface, such as along the Y axis of FIGS. 2-6. Decision 346 can be evaluated no matter what direction the writing element is constructed to determine if one or more yokes are to contact the main write pole as well as how the respective yokes are to be tuned to provide a predetermined magnetic flux profile in the main write pole. That is, decision 346 can design at least one yoke with a tuned width, ABS surface, and position from the ABS to control the manner and timing in which magnetic flux flows towards the write pole tip of the main write pole.

Any designed yokes, positioned on the leading or trailing edge of the main write pole, are formed in step 348, which may involve more than one deposition process, such as growth, masking, and material removal for each yoke. The formation of the yoke(s) in step 348 or the determination that no yokes are to be present in the writing element from decision 346 proceeds to step 350 where an ABS coil turn portion of a continuous write coil is deposited proximal the ABS and write pole. As illustrated in FIGS. 4-6, an ABS coil turn can be tuned in step 350 to have a smaller overall cross-sectional area, closer ABS distance, and smaller separation distance to the main write pole than any other coil turns of the continuous write coil.

The construction of the ABS coil turn in step 350 can be followed by step 352 forming a number of leading edge coil turns some distal location from the ABS compared to the ABS coil turn. Step 352 may form multiple leading edge coil turns that match the ABS coil turn, such as coil turns 264 of FIG. 5, and have similar distances from the main write pole, as shown in FIG. 5. Other embodiments utilize step 352 to form leading edge coil turns that have a common shape and size along with being positioned a common distance from a leading yoke, which contrasts the position of the ABS coil turn in the leading yoke recess and directly adjacent the main write pole, as shown in FIG. 6.

Next, step 354 deposits one or more trailing edge coil turns downtrack from the main write pole. Much like the tuned leading edge coil turns, the trailing edge coil turns can be similar or dissimilar shapes, sizes, and positions relative to the main write pole, trailing yoke, and ABS coil turn. It is noted that the ABS, leading, and trailing coil turns may be differently configured, but are interconnected as part of a single, continuous write coil. The ability to tune the ABS, leading, and trailing coil turns to be different shapes, distances from the ABS, sizes, and distances from the write pole can control the data bit programming timing and write field risetime of the main write pole. The combination of at least one tuned yoke with tuned coil turns provides further control of the speed and reliability of data bit programming.

While routine 340 is not limited to the steps and decision shown in FIG. 7, various embodiments complete the fabrication of the writing element by interconnecting the main write pole with the return pole(s) via one or more magnetic pedestals positioned distal the ABS. These magnetic pedestals allow a data bit programming circuit to be formed with the main write and return pole(s) and may be formed of an unlimited variety of materials in limitless sizes and shapes. It is contemplated that routine 340 further involves implementing the writing element into a transducing head with at least one other data transducing means, such as a magnetoresistive data reader.

Through the unbalanced position, size, and shape of an ABS coil turn, yoke, and main write pole, data bit programming can be optimized as write pole timing and risetime is improved compared to uniform write coils. The combination of tapered write pole tip surfaces in the main write pole with an ABS coil turn that is positioned closer to the write pole and ABS than any other coil turn of a continuous write coil can provide more efficient write pole saturation without unduly increasing the risk of ABS shield saturation and unwanted erasure conditions. The tuned configuration of coil turns, yokes, and the main write pole can further optimize data writing performance by decreasing magnetic polarity switching time, which can be difficult in high areal density data storage environments present in modern data storage devices.

While the embodiments herein have been directed to data writing, it will be appreciated that the claimed aspects can readily be utilized in any number of other applications, including data readers and solid-state data storage device applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a data writer having a write pole and a continuous coil, the continuous coil having a first turn comprising a first cross-sectional shape and a second turn comprising a second cross-sectional shape that differs from the first cross-sectional shape, the second turn positioned proximal a tapered surface portion of a write pole tip of the write pole and an air bearing surface (ABS), the tapered surface positioned on the ABS and oriented at a non-orthogonal position relative to the ABS, the first turn positioned distal the ABS.

2. The apparatus of claim 1, wherein the second cross-sectional shape is rectangular and elongated along an axis perpendicular to the ABS.

3. The apparatus of claim 1, wherein the first cross-sectional shape is rectangular and elongated along an axis parallel to the ABS.

4. The apparatus of claim 1, wherein the second turn is closer to the leading edge and ABS than the first turn.

5. The apparatus of claim 1, wherein the second turn is separated from the write pole by 100-200 nm.

6. The apparatus of claim 1, wherein the second turn is separated from the ABS by 250-500 nm.

7. The apparatus of claim 1, wherein the second turn has a smaller cross-sectional size than the first turn.

8. The apparatus of claim 1, wherein the first turn is positioned proximal the leading edge of the write pole and a third turn of the continuous coil is positioned proximal a trailing edge of the write pole.

9. The apparatus of claim 8, wherein the first and third turns have dissimilar cross-sectional sizes.

10. The apparatus of claim 8, wherein the first and third turns share common cross-sectional width and length dimensions.

11. The apparatus of claim 8, wherein the third turn is separated from the write pole by a greater distance than the first and second turns.

12. The apparatus of claim 1, wherein a third turn of the continuous coil has a common cross-sectional shape and distance from the write pole as the second turn, the first and third turns aligned along an axis perpendicular to the ABS.

13. An apparatus comprising a data writer having a write pole and a continuous coil, the continuous coil having a first turn comprising a first cross-sectional shape and a second turn comprising a second cross-sectional shape that differs from the first cross-sectional shape, the second turn positioned in a recess of a leading edge yoke proximal first and second tapered surfaces of a write pole tip of the write pole and an air bearing surface (ABS), the first and second tapered surface positioned on the ABS and oriented at different non-orthogonal positions relative to the ABS, the first turn positioned distal the ABS.

14. The apparatus of claim 13, wherein the leading yoke contacts the leading edge of the write pole and is separated from the ABS.

15. The apparatus of claim 13, wherein the first turn is positioned outside the recess of the leading edge yoke.

16. The apparatus of claim 13, wherein a trailing edge yoke contacts a trailing edge of the write pole and is separated from the ABS.

17. The apparatus of claim 16, wherein the leading and trailing edge yokes have dissimilar cross-sectional widths.

18. The apparatus of claim 16, wherein the leading and trailing edge yokes each have a single ABS surface proximal the ABS, the ABS surface of the leading edge yoke shaped differently than the ABS surface of the trailing edge yoke.

19. A writing element comprising a data writer having a write pole and a continuous coil, the continuous coil having a first turn comprising a first cross-sectional shape and a second turn comprising a second cross-sectional shape that differs from the first cross-sectional shape, the second turn aligned with a tapered write pole tip portion of the write pole and positioned proximal an air bearing surface (ABS), the tapered write pole tip portion comprising at least one tapered surface positioned on the ABS and oriented at a non-orthogonal position relative to the ABS, the first turn positioned distal the ABS.

20. The writing element of claim 19, wherein the write pole tip comprises a plurality of tapered surfaces each angled differently with respect to the ABS, the plurality of surfaces reducing a cross-sectional width of the write pole to a cross-sectional ABS width.

* * * * *